United States Patent [19]

Studer

[11] Patent Number: 4,710,656
[45] Date of Patent: Dec. 1, 1987

[54] SPRING NEUTRALIZED MAGNETIC VIBRATION ISOLATOR

[76] Inventor: Philip A. Studer, 10313 Ridgemoore Dr., Silver Spring, Md. 20901

[21] Appl. No.: 937,208

[22] Filed: Dec. 3, 1986

[51] Int. Cl.⁴ .............................................. H02K 5/24
[52] U.S. Cl. .................................... 310/51; 188/299; 381/71
[58] Field of Search .............. 188/299; 280/6 R, 707, 280/709, DIG. 1; 310/51, 68 R, 68 B, 68 E, 90.5, 93; 336/100; 335/274, 275; 381/71

[56] References Cited

U.S. PATENT DOCUMENTS

| | | | |
|---|---|---|---|
| 2,973,969 | 3/1961 | Thall | 280/709 |
| 3,941,402 | 3/1976 | Yankowski et al. | 310/90.5 |
| 4,083,433 | 4/1978 | Geohegan, Jr. et al. | 310/51 |
| 4,153,815 | 5/1979 | Chaplin et al. | 381/71 |
| 4,517,505 | 5/1985 | Cunningham | 310/93 |
| 4,600,863 | 7/1986 | Chaplin et al. | 310/51 |

Primary Examiner—Peter S. Wong
Assistant Examiner—D. L. Rebsch
Attorney, Agent, or Firm—Brady, O'Boyle & Gates

[57] ABSTRACT

A single degree of freedom suspension element exhibiting substantially zero natural frequency of vibration with electronically controllable response comprising the combination of a mechanical spring and an "electromagnetic spring" which axially supports a mass located on a base. The electromagnetic spring includes two identical and symmetrical permanent magnet circuits having adjacent like-polarity poles joined by a permeable magnetic shunt member. The magnet circuits include an air gap between pairs of pole faces and within which prominences of a magnetically permeable armature extend therein and partially short each of the air gaps. An electromagnetic coil is located inwardly of the magnetic shunt between the magnetic circuits and encircles the armature between the prominences. The mechanical spring is coupled to the armature and acts to center the prominences in the air gap. Motion of the armature induces currents in the coil which are velocity dependent and opposed to the motion, yielding a viscous damping effect. Energization of the coil results in a differential magnetic flux in the air gaps, producing differential forces tending to move the armature in a predetermined axial direction.

26 Claims, 11 Drawing Figures

SPRING NEUTRALIZED MAGNETIC VIBRATION ISOLATOR

BACKGROUND OF THE INVENTION

This invention relates generally to vibration damping apparatus and more particularly to an active suspension system which is devoid of a natural resonant frequency of vibrational motion.

The vibration behavior of rigid masses exhibits several modes of vibrational motion, each associated with a particular resonant frequency. Methods utilized to reduce the vibration include the use of both active the passive means of isolation. Passive devices include such apparatus as springs and shock absorbers, while active devices include a sensor which senses the motion of the vibrating body and translates this movement into an electrical signal, which is then fed to a driver unit which counteracts the vibrational movement.

Known spring suspensions become weaker in the cross axis directions as their axial stiffness is reduced. Moreover, most mechanical spring suspension characteristics are fixed by their design and construction. Gas springs are known to be adjustable but do not provide radial support without external pressurization, and are unsuitable for certain environments such as the vacuum of outer space.

Accordingly, it is an oject of the present invention to provide an improvement in vibration isolators.

It is another object of the invention to provide an improved single degree of freedom suspension element which can provide a substantially zero natural frequency, thus possessing broadband attenuation characteristics for all higher vibrational frequencies, while still providing physical support in other directions.

And yet a further object of the invention is to provide an electromagnetic vibration isolator having symmetrical control and magnetic centering forces.

And yet another object of the invention is to provide an improved electromagnetic vibration isolator which eliminates frictional effects and which exhibits improved sensitivity.

SUMMARY OF THE INVENTION

The foregoing and other objects of the invention are provided by a combination of mechanical spring means and "electromagnetic spring means" commonly coupled to a mass located on a base and where, in a preferred embodiment, the mechanical spring means is connected to an armature located between a pair of permanent magnets having like poles adjacent one another and connected by a magnetic shunt. The two permanent magnets, moreover, include a pair of pole pieces which terminate in air gaps, with the armature additionally including magnetically permeable prominances extending therefrom into the air gaps, so as to partially short each air gap. An electromagnetic coil encircles the armature between the pair of permanent magnets, which when energized generates a magnetic flux which combines with the magnetic flux of the permanent magnet with a resulting differential total flux being produced. Differential magnetic forces are generated across the air gaps, causing the armature to move in a predetermined manner in the axial direction.

BRIEF DESCRIPTION OF THE DRAWINGS

While the present invention is defined in the claims annexed to and forming a part of the specification, a better understanding can be had by reference to the following description taken in conjunction with the accompanying drawings in which:

DETAILED DESCRIPTION OF THE INVENTION

Figure 1:
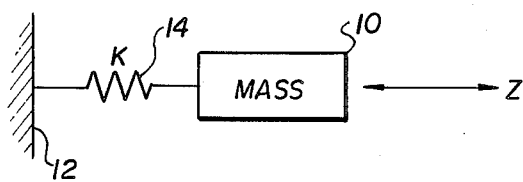
FIG. 1 is a schematic diagram illustrative of a mechanical spring type of vibration isolator system.

Prior to considering the preferred embodiment of the invention, reference will first be made to FIGS. 1 through 5 for the purpose of providing additional background for the invention as it relates to its intended purpose. Referring first to FIG. 1, reference numeral 10 denotes a body consisting of a mass of predetermined proportions which is supported, or suspended on, or from a base 12 by means of a passive vibration damping element having a positive stiffness coefficient of the constant K. Any motion of the base 12 is transmitted to the mass 10 through the spring 14 as a function of frequency.

Figure 2:
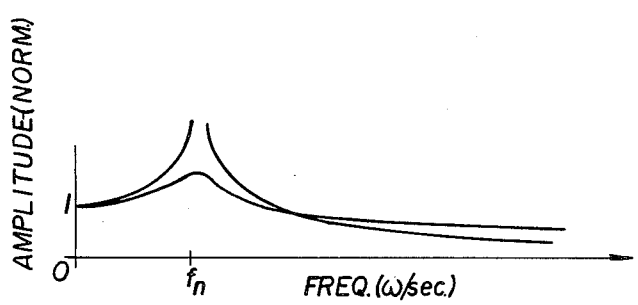
FIG. 2 is a graph generally illustrative of the attenuation characteristic for the vibration isolator system shown in FIG. 1.
Figure 3:
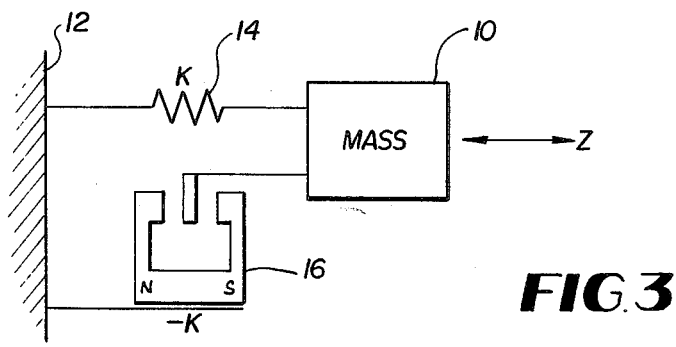
FIG. 3 is a schematic diagram generally illustrative of a vibration isolator system including both a mechanical spring and a magnetic actuator.

As is well known, such a system exhibits a characteristic as shown in FIG. 2 wherein the amplitude of the movement of the mass increases substantially at resonance $f_n$ which is the natural frequency of the mass-spring system. Transmission of motion is attenuated for frequencies above the resonance frequency defined by:

$$f_n = \sqrt{K/M},$$

wherein K is the stiffness constant, and M is the mass of the body being suspended. It can be seen, therefore, that the resonance frequency $f_n$ is directly proportional to K and inversely proportional to M. Therefore, it becomes desirable to make K, the stiffness, as small as possible; however, as the spring becomes weaker, and although it may support the mass in one direction, e.g. axially, it becomes less able to support the mass in other directions such as an axis transverse to the suspension axis. In such an instance, the mass tends to wobble.

Thus what is desired is a vibration isolator or suspension system which exhibits a prescribed radial and axial stiffness, but which exhibits a broadband attenuation of motion characteristic for all frequencies. This now leads to consideration of FIG. 3 where there is now included in combination with the mechanical spring 14 having a positive stiffness coefficient, a "magnetic spring" 16 (more properly a magnetic force) which exhibits a negative coefficient $-K$ (or an approximate equivalent). Accordingly, such a system has a resonance frequency $f_n$ which can be expressed as:

$$f_n = \sqrt{\frac{K + (-K)}{M}}$$

Figure 4:
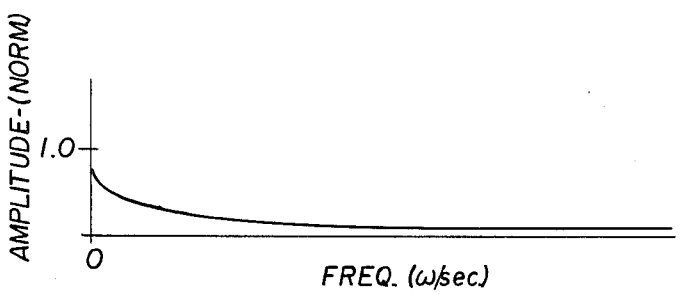
FIG. 4 is a curve illustrative of the attenuation characteristic for the isolator system of FIG. 3.

Thus as the summation of K and $-K$ approaches zero, an attenuation characteristic is provided as shown in FIG. 4, which as shown, decreases asymptotically to zero for all frequencies.

Figure 5:
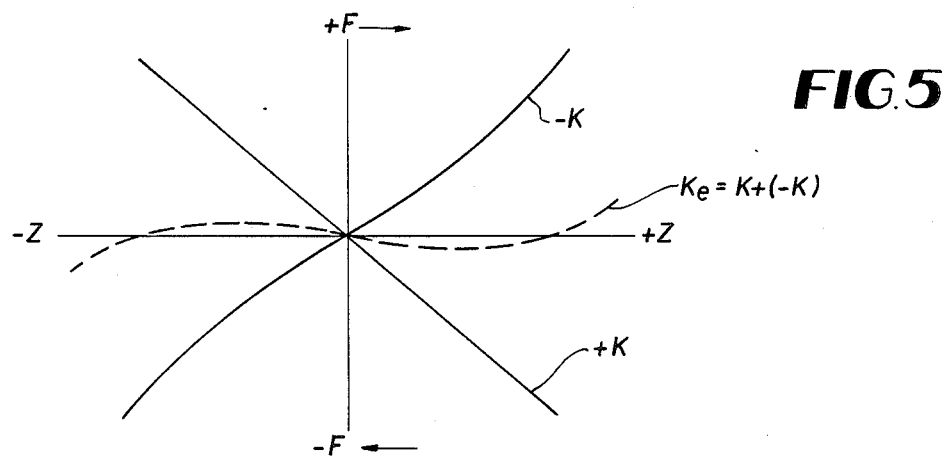
FIG. 5 is a characteristic curve further illustrative of the operation of the subject invention.

It should be noted that "magnetic springs" are inherently non-linear while mechanical springs are substantially linear. Such characteristics are shown in FIG. 5. It can be seen that the effective or net stiffness $K_e$ is the difference between the two characteristics. Nevertheless, it points out that the mechanical spring can be relatively stiff, thus adequately supporting the mass in other directions, while providing a net stiffness $K_e$ which is relatively small and which can approach zero with proper design, so as to provide extremely good high frequency vibration isolation characteristics while providing adequate support in directions perpendicular to the axial or Z axis direction.

The effective stiffness of a normally linear mechanical spring can be modified by changing its effective length as a function of its displacement, specifically by making the cube of the length proportional to the reciprocal of the displacement.

One problem remains, however, that is how to deal with static or slowly varying forces. Where both the mechanical spring 14 and the magnetic spring 16 shown in FIG. 3 comprise passive devices in a one "g" environment, the characteristics described would still provide a vibration isolation system which would still be unsuitable for many applications, e.g. on the legs supporting a table for an optical instrument. This is necessary where a precise fixed position is required due to the fact that little or no force is generated to keep the device centered or even within the working range. It may be useful in a horizontal plane or in a zero "g" application, however. To overcome these limitations, it becomes necessary to provide means to accommodate static forces and relatively low frequency disturbances which might be referred to as "drift".

Figure 6:
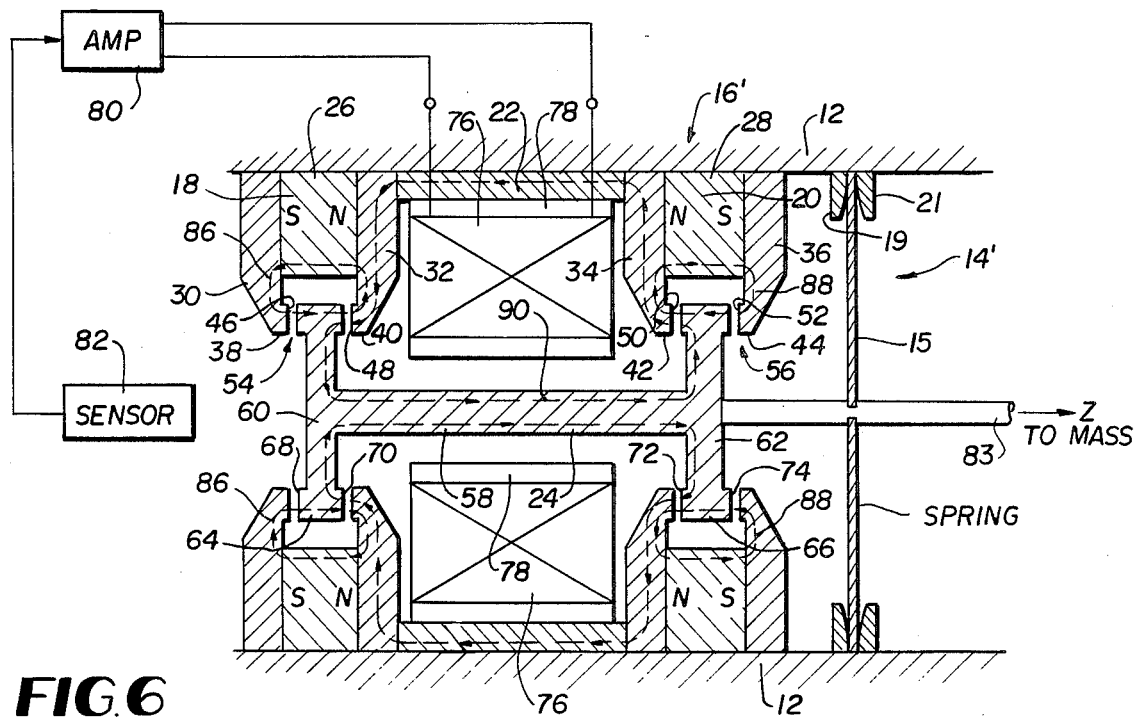
FIG. 6 is a central longitudinal cross-section of the preferred embodiment of the invention.

This now leads to a consideration of the present invention. Referring now to FIG. 6, there is disclosed a central longitudinal cross-section of a structure which comprises a symmetrical figure of revolution about the longitudinal or Z axis and which comprises the axis along which vibration isolation is desired for a mass, not shown. The vibration isolator according to the subject invention comprises an active magnetic spring 16' in combination with a mechanical spring 14' which has a nonlinear characteristic that matches and counters the nonlinear force versus displacement characteristic (FIG. 5) of a magnetic spring. The magnetic spring 16' as shown in FIG. 6 comprises a pair of substantially identical permanent magnet circuits 18 and 20 which are separated along the Z axis by a predetermined distance and which are magnetically coupled by a magnetically permeable shunt member 22 and an axially movable armature 24. The permanent magnet circuits respectively include annular permanent magnet members 26 and 28 which are in the form of flat magnetic rings of rectangular cross section. Like magnetic poles, i.e. the N poles, moreover, are mutually adjacent, i.e. face one another for reasons which will be explained subsequently. Both annular magnets 26 and 28 are flanked by pairs of inwardly projecting pole pieces 30, 32 and 34, 36. The magnetic shunt 22 comprises a circular cylindrical magnetically permeable member which is joined to the outside edges of the pole pieces 32 and 34. The pole pieces 30, 32, 34, 36, moreover, are wider than the magnets 26 and 28 and extend inwardly to right angled termination sections 38, 40 and 42, 44 which include pairs of flat pole faces 46, 48 and 50, 52. The separation between the pairs of pole faces 46, 48 and 50, 52 define a pair of annular air gaps 54 and 56.

The armature 24 comprises an elongated magnetically permeable member 58 of circular cross-section having enlarged end portions 60 and 62 which extend outwardly to thickened annular perimeter regions 64 and 66 termed "prominences" which include respective pairs of faces 68, 70 and 72, 74 which extend into the air gaps 54 and 56 so as to oppose the pole faces 46, 48, and 50, 52 and act to partially short each air gap 54 and 56.

Further as shown in FIG. 6, the invention includes an annular electromagnetic coil 76 which is centrally located around the elongated portion 58 of the armature 24 between the permanent magnet circuits 18 and 20. The electromagnetic coil 76 is located on a non-magnetic coil former 78 which is secured, for example, to the shunt member 22. The magnetic coil is coupled to an energization source shown comprising an amplifier 80 and a sensor 82.

Figure 7:
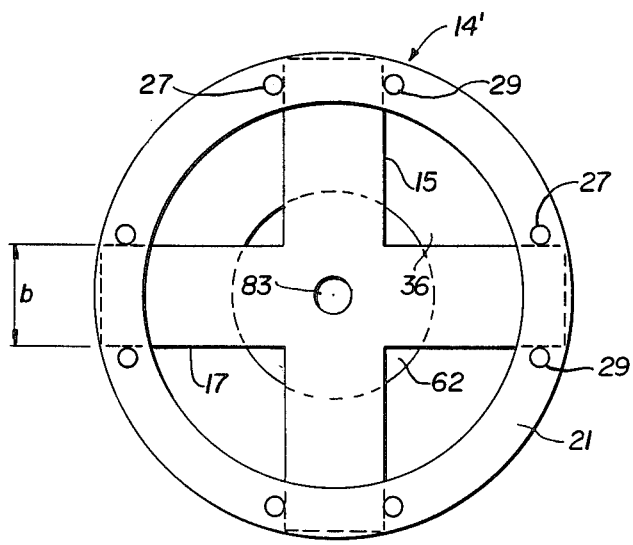
FIG. 7 is an end elevational view of the embodiment shown in FIG. 6.
Figure 8:
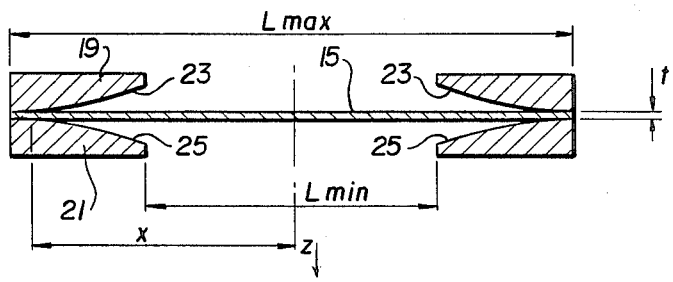
FIG. 8 is a diagrammatical view of the mechanical spring assembly shown in FIG. 6.
Figure 9:
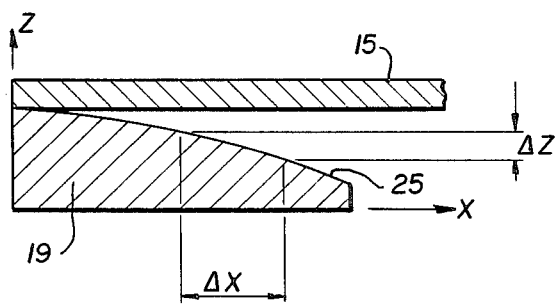
FIG. 9 is an enlarged partial sectional view of the assembly shown in FIG. 8.

The inner end 62 of the armature 24, moreover, is coupled to a mass coupling member 83 which is also coupled to the mechanical spring 14'. The spring 14' as shown in FIGS. 7, 8 and 9 comprises a flat spring structure whose effective length changes with deflection to produce an axial centering force proportional to the square of displacement. This is in contrast to most mechanical springs which obey Hooke's Law where the force exerted is linearly proportional to displacement as shown in FIG. 5.

Referring now to FIGS. 7–9, the structure 14' of the spring comprises a flat disk spring of a thickness t formed from a pair of crossed band elements 15 and 17 having a width b. The bands 15 and 17 cross at the Z axis. The mass coupling member 83 also passes through and connects to the spring at this point. The outer ends of the bands 15 and 17 terminate between and are held in place by a pair of opposing symmetrical rings 19 and 21 whose inner faces 23 and 25 are contoured on either side of the spring elements 15 and 17 and operate to restrict them from axial movement near the outside diameter as the elements deflect so as to shorten their effective length. This is shown in FIGS. 8 and 9 where the maximum length of the spring comprises $L_{max}$. However, the effective length changes upon deflection to a minimum length of $L_{min}$ and depending upon the actual point of deflection, comprises a length of 2x where the spring elements 15 and 17 actually touch the contour surfaces 23 and 25.

While the embodiment of the spring 14' is shown having a shape of a segmented disk and which is additionally held in place by pairs of restraining pins 27 and 29 (FIG. 7), it should be noted that the specifications for the spring and support contour can be calculated to any degree of engineering precision and be reproduced, for example, by numerically controlled machine and thus the spring 14' can be designed to exactly match the actual measured magnetic force curve of the magnetic spring 16' shown in FIG. 6.

Figure 10:
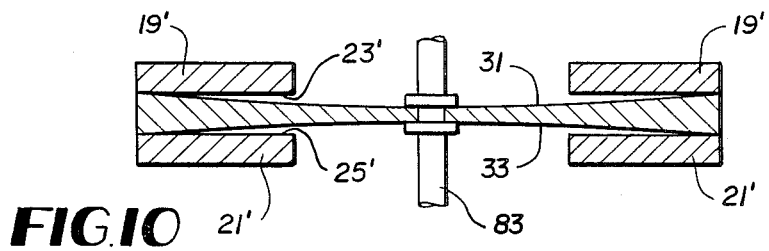
FIG. 10 is a diagrammatical view of a modified form of the spring assembly shown in FIG. 8.

An alternative design or a modification of the means for changing the effective length of the mechanical spring 14' is shown in FIG. 10. There symmetrical rings 19' and 21' are utilized having flat inner faces 23' and 25' but now the thickness t of the spring itself is varied so as to provide a pair of contoured surfaces 31 and 33. This configuration comprises a reversal of that shown in FIG. 8.

In operation, when the armature 24 is centered, first and second magnetic flux paths 86 and 88 traverse the air gaps 54 and 56 through the armature prominences 64 and 66 in opposite polarity directions as shown for the polarities indicated, causing the faces 68, 70 and 72, 74 to stay radially aligned with the opposing pole faces 46, 48, and 50, 52. No net axial force along the Z axis is developed when the armature 24 is centered, since equal flux links both sides of the movable armature faces with the fixed pole faces of the permanent magnets 18 and 20. Also, no magnetic flux traverses the body of the armature 24, when centered, or the shunt 22 when the coil 76 is unenergized. When the armature 24 moves to the right as shown in FIG. 6, the air gap portions to the right decrease, causing increased flux between the opposing faces 48, 70 and 52, 74, with the additional flux now passing through the body of the armature 24 and the shunt 22 along a third magnetic flux path 90. As a result, the armature 24 will be forced to the right. By symmetry, motion in the opposite direction, i.e. to the left, will develop similar forces in the opposite direction due to the direction of the flux in path 90 which reverses. Also action of the mechanical spring 14 tends to restore the armature 24 to a centered position.

The coil 76, however, is a source of variable magnetic flux and depending upon the direction of current flowing within it, it can generate magnetic flux in the armature body 58 along the flux path 90. Furthermore, flux due to the coil current in the coil 76 is always similarly directed in contrast to the oppositely directed permanent magnet flux paths 86 and 88, resulting in differential total flux in the air gaps 54 and 56 and consequent differential forces. Reversing the direction of current flow in the coil 76 will reverse the direction of the force exerted on the armature 24 independent of the Z axis position of the armature with a magnitude proportional to the current in the permanent magnet field.

Since the motion of the armature 24 results in varying magnetic flux in direction and magnitude, a generated voltage will be produced in the enclosed coil 76, resulting in current flow dependent upon the external impedance across the coil leads. These self-generated currents are always in a direction to retard motion and are proportional to velocity. Therefore, electrical damping is inherent and can be enhanced by an external power amplification means well known to those skilled in the art.

With proper design, the stiffness of the spring 14 can provide axial centering force gradients equal to or greater than the decentering forces produced by the permanent magnet circuits 18 and 20. When equal, the armature 24 will have no preferential axial position and zero effective stiffness while still providing radial constraint, thus eliminating wobble of the mass connected to the member 83. It is thus possible to produce a practical vibration isolator of zero natural frequency while exhibiting broadband attenuation for all frequencies.

If the position of one of the movable elements including the armature 24, the connecting elements 83 or the mass itself is measured by a transducer or sensor 82, as shown in FIG. 6 either in an open loop or a closed loop control circuit having adjustable gain which can be provided, for example, by the amplifier 80, a variable effective spring stiffness $K_e$ can be provided which can be equal to zero or not equal to zero depending upon the particular application. Such sensors are well known and are available, for example, in solid state form and operating on photo, inductive or capacitive changes. More importantly, however, the control input to the coil 76 does not have to come from a position sensor or even from a single source. A possible control input can be a velocity sensor as disclosed in U.S. Pat. No. 4,083,433, Geohegan, et al., in which the effect would be a viscous well damped motion. A similar effect of lesser magnitude can be obtained simply by shorting out the leads of the coil 76, in which case the motion induced voltage in the coil 76 due to flux variations in the armature 24 generates energy dissipative currents.

The position could also be maintained relative to some external reference such as an ultrasonic ranging sensor trained at a surface about to be encountered, for example, by a moving vehicle. This latter mode of operation would allow the vibration isolator to move up in anticipation of a bump, or down in anticipation of a pothole, in which case a vehicle could traverse rough terrain with little or minimal jolting forces transmitted to the vehicle. A group or set of actuators as shown in FIG. 6 could be used to support a table or optical bench with a low gain servo being utilized to hold the approximate elevation while a high gain servo with inputs from accelerometers or level sensors at or on the mass so that no angular errors are produced even if base vibrational disturbances are present.

Figure 11:
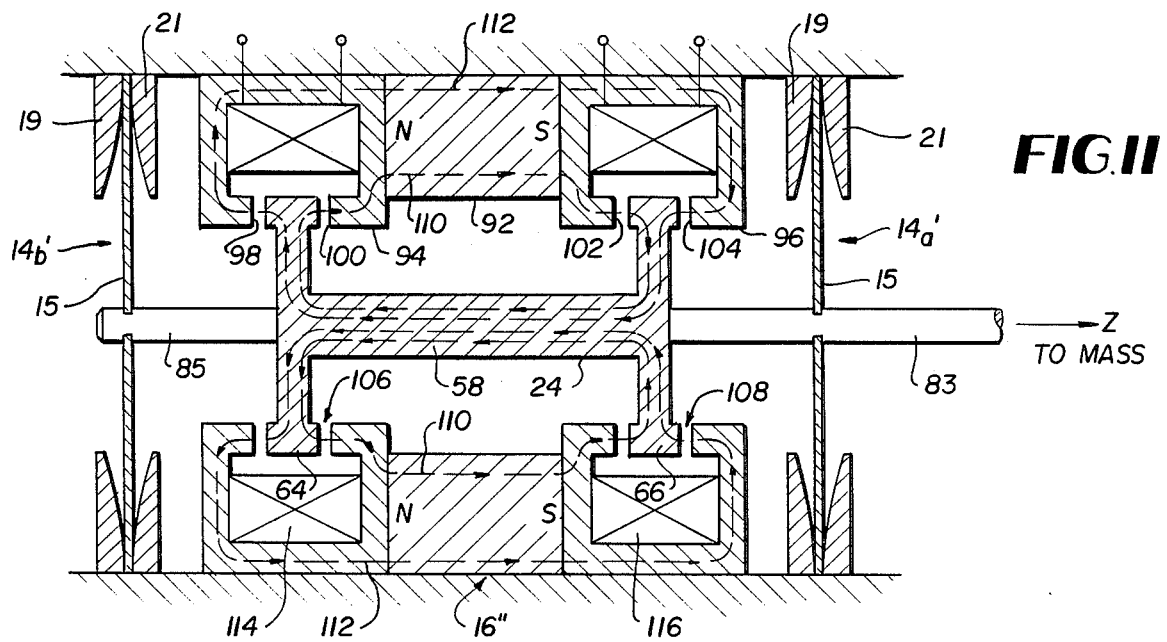
FIG. 11 is a central longitudinal cross-section of a second embodiment of the invention.

An alternate or second embodiment of the invention is illustrated in FIG. 11 and comprises a structure, again a figure of revolution about the Z axis, and including an active magnetic spring 16''. The magnetic spring 16'' is comprised of a single permanent magnet having an annular permanent magnet member 92 of rectangular cross-section which is abutted by two slotted annular pole pieces 94 and 96 which apply flux to pairs of inwardly facing parallel pole faces 98, 100 and 102, 104 which define a pair of differential annular air gaps 106 and 108 into which the annular prominences 64 and 66, having outwardly directed faces, of the armature 24 extends. When centered, even flux distributions as shown by the flux paths 110 and 112 are obtained. In contrast to the embodiment of FIG. 6, the flux paths of the permanent magnet now pass through the elongated body portion of the armature 24 for all positions of the armature, otherwise its operation is essentially the same.

The embodiment of FIG. 11 is further comprised of two separate electromagnetic coils 114 and 116, respectively, located within the pole pieces 94 and 96 as opposed to the single coil 76 shown in FIG. 6. In this instance, the two coils 114 and 116 are also subjected to self-induced currents due to armature motion and each can effect control forces in the axial direction being coupled to suitable amplification and sensor means, not shown.

It should be noted also that the relocation of the magnets and coils on the central Z axis does not intrinsically change the differential force relationships provided as described above or with respect to the preferred embodiment.

Also as shown in FIG. 11, the embodiment depicted therein now includes two mechanical spring structures 14'$_a$, 14'$_b$ located fore and aft of the electromagnetic spring structure 16" as opposed to a single spring 14' as shown in FIG. 6. The mechanical spring 14'$_a$ is coupled to the elongated rod comprising the mass coupling member 83 as before. The second mechanical spring 14'$_b$, however, is now located at the rear of the assembly and is coupled to connecting rod member 85. The addition of the second mechanical spring 14'$_b$ further acts to supply axial and radial centering forces to the prominences 64 and 66 of the armature 24.

Thus what has been shown and described is an electromagnetic vibration isolator which includes both mechanical and magnetic spring means, with the latter having electrical control such that the forces, gradients and null positions can be electrically altered to provide position and dynamic characteristics to suit the particular application. Although not shown, the relative position of the magnetic circuits and the armature can be reversed, when desired, so as to provide an inside out version of the embodiment illustrated in FIGS. 6 and 11 and where, for example, an external armature would bridge two movable pole faces elements.

Having thus shown and described what is at present considered to be the preferred embodiment of the invention, it should be noted that the same has been made by way of illustration and not limitation. Accordingly, all modifications and changes coming within the spirit and scope of the invention as set forth in the appended claims are herein meant to be included.

I claim:

1. A vibration isolator for supporting a mass mounted on a base, comprising:
   mechanical spring means, exhibiting a positive stiffness constant, and electromagnetic force means, exhibiting an effect of a negative stiffness constant, coupled between said mass and said base,
   said electromagnetic force means further comprising, permanent magnetic circuit means including a pair of axially separated air gaps, magnetically permeable armature means extending between said air gaps and having a pair of magnetically permeable prominences partially shorting each of said air gaps, electromagnetic coil means encircling a selected portion of said armature means, and means for selectively energizing said electromagnetic coil means for generating differential magnetic forces across said air gaps and causing said armature to move in a predetermined direction in response to a control signal,
   whereby a vibration isolator having a zero natural frequency response is provided exhibiting broadband attenuation of vibrational frequencies.

2. The vibration isolator as defined by claim 1 wherein said permanent magnet circuit means comprises a like pair of separated permanent magnets, each of said permanent magnets including a pair of opposite polarity pole pieces separated by a respective air gap of said pair of air gaps and wherein like polarity pole pieces of said permanent magnets are adjacent one another,
   wherein said coil means encircles said armature means between like polarity pole pieces; and
   additionally including magnetically permeable shunt means coupling said like polarity pole pieces.

3. The vibration isolator as defined by claim 2 wherein said pole pieces include opposing substantially parallel pole faces and terminate in curved mutually inwardly facing end portions, said opposing parallel pole faces being formed on said end portions.

4. The vibration isolator as defined by claim 3 wherein said prominences include pairs of parallel faces.

5. The vibration isolator as defined by claim 4 wherein said parallel faces of said prominences face outwardly toward respective inwardly facing parallel faces of said pole pieces.

6. The vibration isolator as defined by claim 4 wherein said prominences comprise generally circular plate type elements having a thickened peripheral region containing said parallel faces.

7. The vibration isolator as defined by claim 3 and wherein said magnetically permeable prominences of said armature means include a pair of substantially parallel faces located in said air gaps opposite said pole faces.

8. The vibration isolator as defined by claim 7 and wherein said armature means comprises an elongated armature member terminating in outwardly projecting members including said magnetically permeable prominences.

9. The vibration isolator as defined by claim 2 wherein said coil means is located inside of said shunt means.

10. The vibration isolator as defined by claim 2 wherein said pole pieces and said armature means comprise figures of revolution about a common axis.

11. The vibration isolator as defined by claim 10 wherein said permanent magnet circuit means additionally include annular permanent magnet members located between each pair of pole pieces.

12. The vibration isolator as defined by claim 11 wherein said pole pieces are mutually symmetrical and aligned with said common axis.

13. The vibration isolator as defined by claim 12 wherein said shunt means comprises a cylindrical magnetically permeable shunt.

14. The vibration isolator as defined by claim 1 wherein said spring means acts to center said prominences radially and axially in said air gaps while at rest.

15. The vibration isolator as defined by claim 1 wherein said mechanical spring means comprises flat spring means located between a pair of opposing members having contoured spring contact surfaces which operate to shorten the effective length of the mechanical spring means upon deflection and thereby provide a square law force versus displacement characteristic.

16. The vibration isolator as defined by claim 14 wherein said mechanical spring means comprises a spring means having contoured surfaces located between a pair of opposing members having flat spring contact surfaces which operate to shorten the effective length of the mechanical spring means upon deflection and thereby provide a square law force versus displacement characteristic.

17. The vibration isolator as defined by claim 1 wherein said permanent magnet circuit means comprises a single permanent magnet including a pair of axially separated pole pieces of opposite polarity, each of said pole pieces terminating in mutually inwardly facing end portions having opposing parallel pole faces defining said air gaps; and
   wherein said coil means comprise first and second electromagnetic coils respectively located on said pole pieces adjacent said prominences of said armature means.

18. The vibration isolator as defined by claim 17 wherein said prominences include pairs of parallel faces.

19. The vibration isolator as defined by claim 18 wherein said parallel faces of said prominences face outwardly toward respective inwardly facing parallel faces of said pole pieces.

20. The vibration isolator as defined by claim 19 wherein said armature means comprises an elongated armature member terminating in outwardly projecting members including said prominences.

21. The vibration isolator as defined by claim 17 wherein said permanent magnet and said armature means comprise figures of revolution about a common axis.

22. The vibration isolator as defined by claim 1 wherein said mechanical spring means comprises a pair of flat spring means coupled to operate ends of said armature means and which act to center said prominences radially and axially in said air gaps while at rest.

23. The vibration isolator as defined by claim 1 and wherein said coil means is energized in response to axial movement of said armature means to recenter said prominences within the air gaps.

24. The vibration isolator as defined by claim 1 and additionally including sensor means responsive to linear movement of said armature means and being operable to generate and couple an energizing signal to said electromagnetic coil means, said coil means generating magnetic flux which results in a differential total flux in the air gaps producing differential magnetic forces for recentering said prominences in said air gaps.

25. The vibration isolator as defined by claim 1 and additionally including sensor means responsive to an external stimulus and being operable to generate and couple an energizing signal to said electromagnetic coil means for generating a flux across said air gaps which operates in combination with the magnetic flux provided by said permanent magnet circuit means to produce a differential total flux in said air gaps, thereby generating differential magnetic forces across the air gaps to cause said armature to move in an axial direction.

26. The vibration isolator as defined in claim 1 and additionally including coil means connected to external means to provide rate dependent damping forces due to self induced currents resulting from axial motion of said armature means.

* * * * *